(12) United States Patent
Ashton et al.

(10) Patent No.: US 7,850,897 B2
(45) Date of Patent: Dec. 14, 2010

(54) METHOD AND DEVICE FOR MANUFACTURING A UNITARY CAUL SHEET

(75) Inventors: Larry J. Ashton, Mapleton, UT (US); William T. McCarvill, Cottonwood Heights, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 0 days.

(21) Appl. No.: 11/686,246

(22) Filed: Mar. 14, 2007

(65) Prior Publication Data
US 2008/0224360 A1 Sep. 18, 2008

(51) Int. Cl.
B32B 37/10 (2006.01)
B29C 35/04 (2006.01)
B29C 43/10 (2006.01)

(52) U.S. Cl. .............. 264/512; 264/521; 264/342 R

(58) Field of Classification Search ........... 264/510, 264/512, 521, 523, 535, 221, 232, 238, 342 R
See application file for complete search history.

(56) References Cited

U.S. PATENT DOCUMENTS

| | | | | |
|---|---|---|---|---|
| 3,751,196 A | * | 8/1973 | Cannon et al. ........... 425/4 R |
| 4,126,659 A | * | 11/1978 | Blad ...................... 264/573 |
| 4,624,874 A | * | 11/1986 | Schutze ................... 428/34.9 |
| 4,681,724 A | * | 7/1987 | Faiz et al. ................ 264/257 |
| 5,286,438 A | * | 2/1994 | Dublinski et al. ......... 264/220 |
| 5,520,532 A | * | 5/1996 | Reinfelder et al. ....... 425/500 |
| 5,683,646 A | * | 11/1997 | Reiling, Jr. ............... 264/512 |
| 5,876,546 A | * | 3/1999 | Cloud ..................... 156/212 |
| 6,093,358 A | * | 7/2000 | Schiewe et al. .......... 264/250 |
| 6,191,248 B1 | * | 2/2001 | Rawlings et al. .......... 528/68 |
| 6,290,895 B1 | * | 9/2001 | Wang et al. .............. 264/510 |
| 6,692,681 B1 | * | 2/2004 | Lunde ..................... 264/510 |
| 6,983,849 B1 | * | 1/2006 | Toler et al. ............... 209/659 |
| 2002/0031963 A1 | * | 3/2002 | Mead ....................... 441/74 |
| 2002/0110664 A1 | * | 8/2002 | Seidner .................... 428/131 |
| 2002/0135093 A1 | * | 9/2002 | Davis ...................... 264/102 |
| 2004/0070108 A1 | * | 4/2004 | Simpson et al. .......... 264/236 |
| 2005/0019552 A1 | * | 1/2005 | Wiersma et al. .......... 428/325 |
| 2005/0123740 A1 | * | 6/2005 | Hume ................... 428/319.3 |
| 2005/0183818 A1 | * | 8/2005 | Zenkner et al. ........... 156/285 |
| 2006/0046068 A1 | * | 3/2006 | Barancyk et al. ........ 428/423.1 |

* cited by examiner

*Primary Examiner*—Joseph S Del Sole
*Assistant Examiner*—Ryan Ochylski
(74) *Attorney, Agent, or Firm*—Nydegger & Associates

(57) ABSTRACT

A method and device are provided for manufacturing a unitary caul sheet to be used in creating a composite material fuselage for an airplane. Specifically, a generally tubular shaped tool having a hollow interior cavity defining a fuselage IML surface is provided. In the method, a caul sheet material such as polyurea is applied to the IML surface before an armature is inserted into the interior cavity of the tool. Then, a filler material is introduced between the armature and the caul sheet material. Further, steam is injected to form the filler material into an infrastructure. Then, the caul sheet material is cured before the tool is removed from the caul sheet material to expose the caul sheet to receive composite material.

10 Claims, 2 Drawing Sheets

METHOD AND DEVICE FOR MANUFACTURING A UNITARY CAUL SHEET

FIELD OF THE INVENTION

The present invention pertains generally to components needed for the production of airplane fuselages. More particularly, the present invention pertains to caul sheets used to form composite material into airplane fuselage skins. The present invention is particularly, but not exclusively, useful as a device and method for manufacturing a unitary caul sheet for use in creating unitary fuselage skins.

BACKGROUND OF THE INVENTION

Aircraft manufacturers continually strive to find ways that will improve aircraft efficiency and reduce the costs that are associated with the manufacture and maintenance of aircraft. One consideration that is frequently taken to improve aircraft efficiency is to reduce the weight of the craft. In many fields, composite materials have been used in place of heavier traditional materials for this purpose. Accordingly, the use of composite materials for the manufacture of structural components has expanded considerably over the past years. In particular, composite materials that are made of carbon fibers and epoxy resins have been successfully used for the manufacture of various types of vehicles (e.g. cars, boats and airplanes). In part, this has happened because these materials are relatively light-weight, and they exhibit high strength in both tension and compression. They are also quite damage tolerant and resistant to puncture. Further, they inhibit water migration. However, conventional methods for manufacturing aircraft components with composite materials typically require relatively expensive tooling and labor-intensive assembly procedures. Frequently, an aircraft component is assembled from composite segments cured on separate caul sheets.

In light of the above, it is an object of the present invention to provide a method and device for manufacturing a caul sheet for use in creating a unitary airplane fuselage that is to be made from composite materials. Another object of the present invention is to provide a method for manufacturing a substantially tubular caul sheet. Another object of the present invention is to provide a method for manufacturing a caul sheet that is relatively simple and easy to implement and that is comparatively cost effective.

SUMMARY OF THE INVENTION

When creating a composite component for an airplane, a caul sheet may be required. Importantly, when used, the caul sheet needs to be formed as an inner mold line (IML) with a surface that is a mirror-image (i.e. a negative) of a desired surface of the component. The present invention involves a method for manufacturing such a caul sheet as a unitary structure. This requires the use of a generally tubular tool. Structurally, the tool has a hollow interior cavity that defines the inner mold line (IML) surface for the caul sheet. More specifically, the tool is formed from three tool portions that are juxtaposed to establish the hollow interior cavity and IML surface.

In order to manufacture the caul sheet, a caul sheet material such as a self-curing, two-component polyurea is sprayed onto the interior cavity's IML surface. Thereafter, an armature is inserted into the interior cavity of the tool. Then, a filler material such as polystyrene is introduced into the interior cavity between the armature and the caul sheet material.

After the caul sheet material, filler material and armature are established in the interior cavity of the tool, steam is injected into the filler material to cause the filler material to form into infrastructure. Further, due to its self-curing nature, the caul sheet material cures on the IML surface. After the curing process is finished, the three tool portions are removed from the caul sheet material to expose the finished caul sheet. Thereafter, composite material may be applied to the caul sheet for formation of a fuselage skin.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
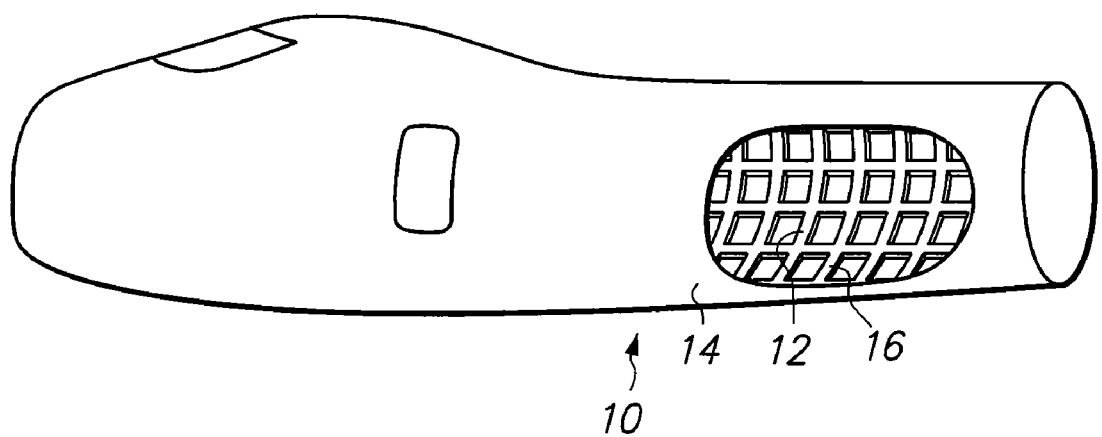
FIG. 1 is a perspective view of a unitary fuselage skin with a portion cut away to illustrate interior features.

Referring initially to FIG. 1, an exemplary unitary fuselage skin is shown and is generally designated 10. As shown, the fuselage skin 10 has a surface 12 defined by an inner mold line (IML) and a surface 14 defined by an outer mold line (OML). For structural strength, the IML surface 12 is provided with stiffening members 16. In accordance with the present invention, the fuselage skin 10 is formed from composite material positioned against a caul sheet (see FIG. 2).

Figure 2:
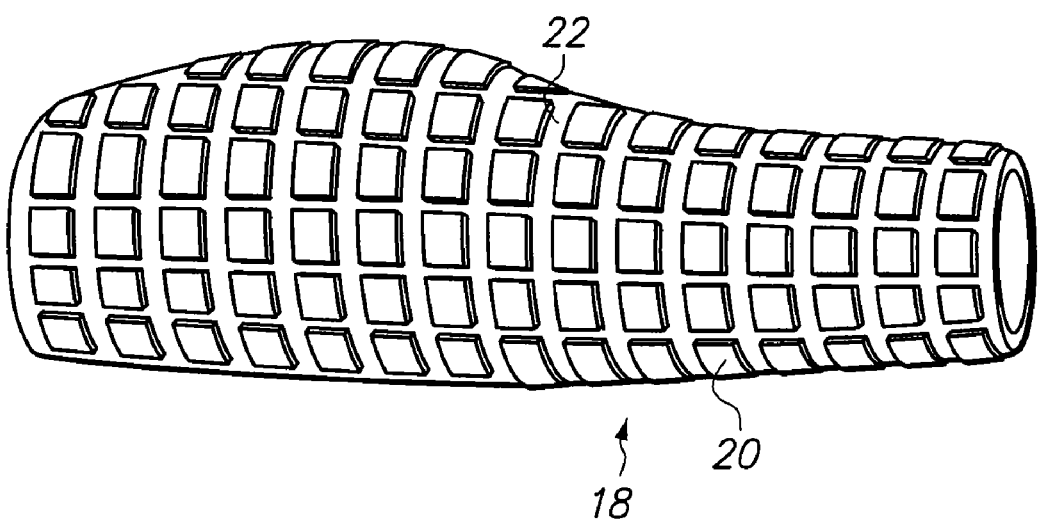
FIG. 2 is a perspective view of a caul sheet used for manufacturing a unitary fuselage skin as shown in FIG. 1.

Referring now to FIG. 2, a caul sheet in accordance with the present invention is shown and is generally designated 18. In FIG. 2 it is seen that the caul sheet 18 forms an outer surface 20 that is the negative of the IML surface 12 of the fuselage skin 10. Specifically, the outer surface 20 of the caul sheet 18 includes grooves 22 that correspond to the stiffening members 16 of the IML surface 12. As a result, composite material positioned on the outer surface 20 of the caul sheet 18 may be cured to form a fuselage skin 10 having the proper IML surface 12.

Figure 3:
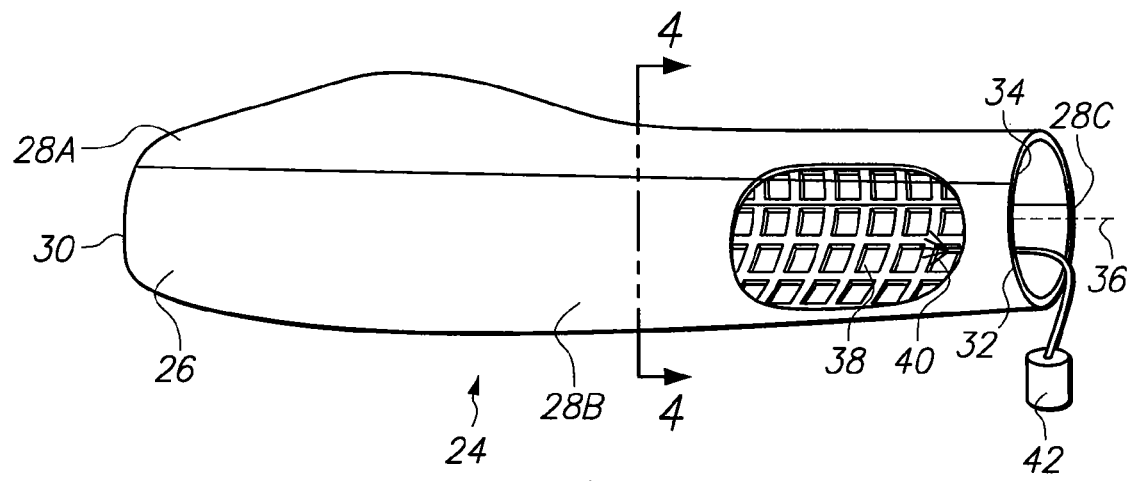
FIG. 3 is a perspective view of a device for manufacturing a caul sheet as shown in FIG. 2, with a portion cut away to show interior features, in accordance with the present invention.

With FIGS. 1 and 2 in mind, the present invention, a device for manufacturing a unitary caul sheet, generally designated 24, may be understood. Referring to FIG. 3, a tool 26 for forming a caul sheet 18 as shown in FIG. 2 is illustrated. In FIG. 3, it can be seen that the tool 26 includes three portions 28a-c that are juxtaposed to form a generally tubular shape. Further, the tool 26 extends from an end 30 to an end 32 and defines a hollow interior cavity 34. As shown, the hollow interior cavity 34 defines an interior axis 36 and is bounded by a surface 38 that is identical to a desired IML surface 12. It is the surface 38 on which a caul sheet material 40 may be applied during manufacture of a caul sheet 18. For instance, the caul sheet material 40 may be a two-component polyurea that is sprayed onto the surface 38 from a spraying unit 42, as shown.

Figure 4:
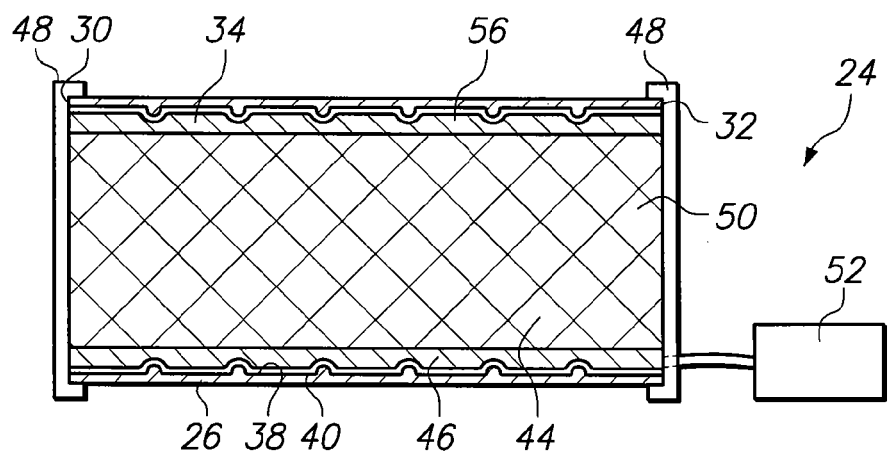
FIG. 4 is a cross sectional view of the device of FIG. 3, taken along line 4-4 in FIG. 3, and including additional device components for manufacturing a caul sheet in accordance with the present invention.

Turning now to FIG. 4, further aspects of the device 24 may be described. As shown, the device 24 includes an armature 44 that can be positioned within the interior cavity 34 of the tool 26. Further, the device 24 includes a filler material 46, such as polystyrene beads, that may be positioned between the surface 38 on which the caul sheet material 40 is applied and the armature 44. Also, the device 24 is provided with end caps 48 that may be positioned on the ends 30, 32 to seal the interior cavity 34. When the interior cavity 34 is sealed, it may be considered to be a vessel 50. Further, the device 24 includes a unit 52 for injecting steam into the vessel 50.

In order to manufacture a unitary caul sheet 18, the three tool portions 28a-c are juxtaposed as shown in FIG. 3, to form the interior cavity 34 defined by the surface 38. Thereafter, the caul sheet material 40 is applied to the surface 38 from the spraying unit 42 and effectively cured on the surface 38 within a few minutes time. The armature 44 can then be inserted into the interior cavity 34 of the tool 26 as shown in FIG. 4. After the armature 44 is positioned in the interior cavity 34, the filler material 46 is introduced between the armature 44 and the caul sheet material 40. At this point, each end 30, 32 is capped with an end cap 48. Then steam is injected into the filler material 46 by the unit 52, causing the filler material 46 to expand and form a unitary infrastructure 56. During its expansion, the filler material 46 may urge the caul sheet material 40 against the surface 38. The three tool portions 28a-c are then removed to expose the cured caul sheet 18. Specifically, each tool portion 28a-c is moved radially away from the interior axis 36 and the cured caul sheet 18 remains supported by the infrastructure 56.

After the caul sheet 18 is formed, it may be used to create the fuselage skin 10 for an aircraft. During the manufacture of a fuselage skin 10, composite material is initially applied to the outer surface 20 of the caul sheet 18 while the caul sheet 18 is still supported on the armature 44 by the filler infrastructure 56. Specifically, composite material is wound onto the caul sheet 18 as the armature 44 rotates the caul sheet 18 about the axis 36. After the composite material is positioned on the caul sheet 18, the armature 44 is inserted into a hollow mold cavity (not shown). In order to form the desired fuselage skin 10, the hollow mold cavity has an inner surface that is a negative or mirror image of the fuselage skin's desired OML. After the armature 44 is inserted into the mold cavity, heat is applied to cause the filler infrastructure 56 to shrink and collapse. Then the armature 44 is removed from the mold cavity, leaving the semi-rigid caul sheet 18 in position with the composite material adjacent to the mold cavity's inner surface. Thereafter, the caul sheet 18 is pressurized to between about 40 and 90 psi and slightly inflated to push the composite material against the inner surface of the mold cavity. During this step, the composite material is cured with an IML imposed by the caul sheet 18 and an OML imposed by the cavity mold. Specifically, the composite material is cured by a heat regimen of 2 hours at a temperature of at least 275° F., and preferably between 275° and 350° F. Typically, this heating process involves a ramp up period of approximately 2 hours to reach 275° F., as well as a 2 hour cool down period. After the curing process is finished, the pressurization of the caul sheet 18 is ended and the caul sheet 18 contracts away from the cured composite material forming the fuselage skin 10. Then, the caul sheet 18 is removed from the fuselage skin 10 and the fuselage skin 10 is extracted from the cavity mold.

While the particular Method and Device for Manufacturing a Unitary Caul Sheet as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a unitary caul sheet for use in creating a unitary fuselage which comprises the steps of:
   providing a tool, wherein the tool is generally tubular shaped and has a hollow interior cavity defining an Inner Mold Line (IML) surface, and further wherein the tool has a first end and a second end;
   spraying a caul sheet material onto the Inner Mold Line (IML) surface;
   inserting an armature into the interior cavity of the tool;
   filling the interior cavity of the tool between the armature and the caul sheet material with beads of a filler material;
   capping the first and second ends of the tool to create a vessel;
   injecting steam into the vessel to form the filler material to create an infrastructure for the caul sheet material;
   curing the caul sheet material;
   removing the tool from the caul sheet material to expose an outer surface of the caul sheet; and
   applying a composite material to the outer surface of the caul sheet to create a combination thereof on the infrastructure;
   positioning the combination in a hollow mold cavity;
   heating the infrastructure to shrink and collapse the infrastructure;
   removing the armature and infrastructure from the hollow mold cavity; and
   pressurizing the combination inside the hollow mold cavity to create the unitary fuselage.

2. A method as recited in claim 1 wherein the filler material expands to create the infrastructure.

3. A method as recited in claim 1 wherein the filler material comprises polystyrene beads.

4. A method as recited in claim 1 wherein the tool includes three portions juxtaposed to form the hollow interior cavity and to define an interior axis, and wherein during the removing step each portion of the tool is moved radially away from the interior axis to expose the caul sheet.

5. A method as recited in claim 1 wherein the caul sheet material is a two-component polyurea.

6. A method as recited in claim 5 wherein the caul sheet material is self-curing.

7. A method as recited in claim 1 wherein, after the step of removing the tool, the infrastructure supports the caul sheet.

8. A method for manufacturing a substantially tubular, unitary caul sheet for use in creating a unitary fuselage which comprises the steps of:
   providing a tool, wherein the tool has a hollow interior cavity defining a fuselage Inner Mold Line (IML) surface, and further wherein the tool has a first end and a second end;
   applying a caul sheet material formed from polyurea onto the Inner Mold Line (IML) surface;
   inserting an armature into the interior cavity of the tool;
   introducing beads of a filler material formed from polystyrene beads into the interior cavity of the tool between the armature and the caul sheet material;
   capping the first and second ends of the tool to create a vessel;
   injecting steam into the vessel to form the filler material to create an infrastructure for the caul sheet material;
   curing the caul sheet material;
   removing the tool from the caul sheet material to expose an outer surface of the caul sheet; and applying a composite material to the outer surface of the caul sheet to create a combination thereof on the infrastructure;

positioning the combination in a hollow mold cavity;

heating the infrastructure to shrink and collapse the infrastructure;

removing the armature and infrastructure from the hollow mold cavity; and pressurizing the combination inside the hollow mold cavity to create the unitary fuselage.

9. A method as recited in claim 8 wherein the tool includes three portions juxtaposed to form the hollow interior cavity and to define an interior axis, and wherein during the removing step each portion of the tool is moved radially away from the interior axis to expose the caul sheet.

10. A method as recited in claim 8 wherein during the applying step, the caul sheet material is sprayed onto the Inner Mold Line (IML) surface.

\* \* \* \* \*